United States Patent
Hirasawa

(10) Patent No.: US 8,030,402 B2
(45) Date of Patent: Oct. 4, 2011

(54) POLYLACTIC ACID RESIN COMPOSITION

(75) Inventor: Toshikazu Hirasawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 226 days.

(21) Appl. No.: 12/530,530

(22) PCT Filed: Apr. 13, 2009

(86) PCT No.: PCT/JP2009/057805
§ 371 (c)(1),
(2), (4) Date: Sep. 9, 2009

(87) PCT Pub. No.: WO2009/131079
PCT Pub. Date: Oct. 29, 2009

(65) Prior Publication Data
US 2010/0317801 A1    Dec. 16, 2010

(30) Foreign Application Priority Data

Apr. 25, 2008  (JP) .................. 2008-115735

(51) Int. Cl.
*C08L 67/02*    (2006.01)

(52) U.S. Cl. ................................. 525/175; 525/186
(58) Field of Classification Search ............ 525/175, 525/186
See application file for complete search history.

(56) References Cited

U.S. PATENT DOCUMENTS

| 5,216,050 | A  | * | 6/1993  | Sinclair ................ 524/108 |
| 6,027,677 | A  | * | 2/2000  | Ostapchenko et al. ... 264/210.1 |
| 6,495,631 | B1 | * | 12/2002 | Randall et al. ............. 525/186 |
| 7,001,951 | B2 | * | 2/2006  | Chapman et al. ......... 525/101 |

FOREIGN PATENT DOCUMENTS

| JP | 2003-286396 A | 10/2003 |
| JP | 2004-285258 A | 10/2004 |
| JP | 2005-29759 A  | 2/2005  |

* cited by examiner

*Primary Examiner* — Bernard Lipman
(74) *Attorney, Agent, or Firm* — Fitzpatrick, Cella, Harper & Scinto

(57) ABSTRACT

A polylactic acid resin composition is provided which contains a polylactic acid (A), an epoxy-modified silicone-acrylic rubber (B1) and a methyl methacrylate-butadiene-styrene copolymer rubber (B2). The polylactic acid resin composition is superior in impact resistance.

3 Claims, 1 Drawing Sheet

POLYLACTIC ACID RESIN COMPOSITION

TECHNICAL FIELD

This invention relates to a polylactic acid resin composition excellent in impact resistance.

BACKGROUND ART

Among thermoplastic resins, polyester resin is superior in physical properties such as mechanical properties and heat resistance, and is used in electric component parts, business machine component parts and so froth. In recent years, however, the polyester resin is required to be further improved in physical properties. Specifically, a laminar clay mineral, an impact modifier, etc. are added to a thermoplastic resin and melt-kneaded by means of a kneading machine, to thereby attempt to improve physical properties. Researches are energetically made also on a composite technique for resins of vegetable origin, such as polylactic acid.

As for the composite technique, as disclosed in Japanese Patent Laid-open Application No. 2003-286396, it is attempted that a polymer of a multi-layer structure is added to polylactic acid to improve impact resistance. It is also disclosed in Japanese Patent Laid-open Application No. 2005-29759 that an unmodified natural rubber and an acryl-modified natural rubber are added to polylactic acid to improve impact resistance. However, resin compositions disclosed in these publications are improved in impact resistance when compared with those to which the stated material(s) has or have not been added, but do not have strength enough to be used as structural component parts.

DISCLOSURE OF THE INVENTION

As a result of studies on the above problem, the present inventors have arrived at an invention of a polylactic acid resin composition which can provide a molded product having impact resistance superior to conventional molded products when the total amount of additives added to polylactic acid is the same.

The polylactic acid resin composition of the present invention is a polylactic acid resin composition which contains a polylactic acid (A), an epoxy-modified silicone-acrylic rubber (B1) and a methyl methacrylate-butadiene-styrene copolymer rubber (B2), where the respective constituents are preferably in such a mass ratio that the polylactic acid (A) is from 65% by mass or more to 95% by mass or less, the epoxy-modified silicone-acrylic rubber (B1) is from 2.5% by mass or more to 17.5% by mass or less and the methyl methacrylate-butadiene-styrene copolymer rubber (B2) is from 2.5% by mass or more to 17.5% by mass or less.

According to the present invention, a polylactic acid resin composition having superior impact resistance can be provided which contains a polylactic acid (A), an epoxy-modified silicone-acrylic rubber (B1) and a methyl methacrylate-butadiene-styrene copolymer rubber (B2).

Further features of the present invention will become apparent from the following description of exemplary embodiments with reference to the attached drawings.

BEST MODE FOR CARRYING OUT THE INVENTION

The present invention provides a polylactic acid resin composition containing a polylactic acid (A), an epoxy-modified silicone-acrylic rubber (B1) and a methyl methacrylate-butadiene-styrene copolymer rubber (B2).

In the present invention, it is important for the polylactic acid resin composition to be incorporated with two types of materials, the epoxy-modified silicone-acrylic rubber (B1) and the methyl methacrylate-butadiene-styrene copolymer rubber (B2). In particular, when these are added in quantities equal to each other, the addition of the two types of materials, the epoxy-modified silicone-acrylic rubber (B1) and the methyl methacrylate-butadiene-styrene copolymer rubber (B2) polylactic acid, can provide a molded product having a high Charpy impact value.

The incorporation of the two types of materials into the polylactic acid enables the polylactic acid to be uniformly dispersed in the whole resin composition, and can provide molded products having superior impact resistance when molded products are produced using the polylactic acid resin composition of the present invention.

The polylactic acid (A) may be in the form of a copolymer such as a homopolymer, a random copolymer or a block copolymer or a mixture of any of these, and is inclusive of polymers the terminal groups of which are blocked or modified.

Of commercially available polylactic acids, what may preferably be used are:

LACEA H100, LACEA M-151S Q04, LACEA M-151S Q52 and LACEA H-100F19 (trade names; all available from Mitsui Chemicals, Inc.); TERRAMAC TE-2000, TERRAMAC TE-1030, TERRAMAC TE-1070, TERRAMAC TE-7000, TERRAMAC TE-7307, TERRAMAC TE-7300, TERRAMAC TE-8210, TERRAMAC TE-8300, TERRAMAC TP-4000, TERRAMAC TP-4030 and TERRAMAC HV-6200 (trade names; all available from Unichica Ltd.); and ECODEAR (trade name; available from Toray Industries, Inc.).

These commercially available polylactic acids may be used each singly or in combination. The polylactic acid (A) may preferably have a mass-average molecular weight of from 10,000 to 400,000, and more preferably from 100,000 to 300,000. The polylactic acid (A) may also preferably be in a mass ratio of from 65% by mass or more to 95% by mass or less, and more preferably from 80% by mass or more to 95% by mass or less. When the mass ratio is from 65% by mass or more to 95% by mass or less promises, a good effect is exhibited on the load-deflection temperature that is an index of heat resistance.

As the epoxy-modified silicone-acrylic rubber (B1), a polymer may be used which has an acrylic component including an alkyl acrylate unit, a silicone component including a silyl group-terminated polyether unit, and a glycidyl group-containing vinyl unit. The polymer preferably has a multi-layer structure.

Figure 1:
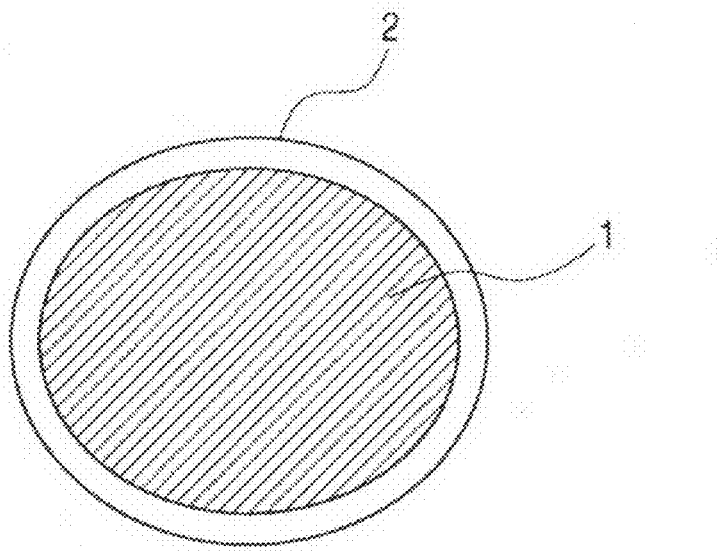
FIG. 1 is a schematic view showing a core-shell structure.

Herein, the polymer having a multi-layer structure refers to a polymer having a structure of the so-called core-shell type, which is made up of an innermost part layer (core layer) and at least one layer (shell layer) that covers the innermost layer and in which the layers contiguous to each other are composed of polymers different in type. Its schematic view is shown in FIG. 1, where reference numeral 1 denotes the core layer, and 2, the shell layer.

In the epoxy-modified silicone-acrylic rubber (B1), the core layer is formed of a composite polymer composed of the acrylic component including an alkyl acrylate unit and the silicone component including a silyl group-terminated polyether unit, and the shell layer is formed of a polymer component having the glycidyl group-containing vinyl unit.

A typical example is as shown below, which is represented by structural formulas.

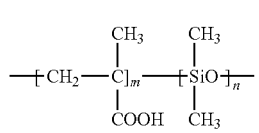

Chemical Formula 1

Chemical Formula 1 represents the unit structure of the material which makes up the core. The left-hand moiety of Chemical Formula 1 is an alkyl acrylate unit and the right-hand moiety is a silyl group-terminated polyether unit.

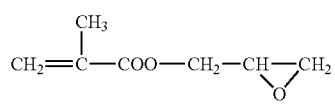

Chemical Formula 2

Chemical formula 2 represents the unit structure of the material which makes up the shell layer. What is represented by Chemical Formula 2 is the glycidyl group-containing vinyl unit.

The alkyl acrylate unit specifically includes:

methyl methacrylate, ethyl methacrylate, n-propyl methacrylate, n-butyl methacrylate, t-butyl methacrylate, n-hexyl methacrylate, 2-ethylhexyl methacrylate;

cyclohexyl methacrylate, stearyl methacrylate, octadecyl methacrylate, phenyl methacrylate, benzyl methacrylate, chloromethyl methacrylate, 2-chloroethyl methacrylate, 2-hydroxyethyl methacrylate;

3-hydroxypropyl methacrylate, 2,3,4,5,6-pentahydroxyhexyl methacrylate, 2,3,4,5-tetrahydroxypentyl methacrylate, aminoethyl methacrylate, propylaminoethyl methacrylate; and dimethylaminoethyl methacrylate, ethylaminopropyl methacrylate, phenyl aminoethyl methacrylate, and cyclohexylaminoethyl methacrylate. These units may be used may each singly or in combination.

The silyl group of the silyl group-terminated polyether unit specifically includes:

alkyl (such as methyl, ethyl, propyl and butyl) silyl groups; halogenated alkyl (such as 3-chloropropyl and 3,3,3-trifluoropropyl) silyl groups; and alkenyl (such as vinyl, allyl and butenyl) silyl groups; aryl (such as phenyl, tolyl and naphthyl) silyl groups; cycloalkyl (such as cyclopentyl and cyclohexyl) silyl groups; benzyl, arylalkyl (such as phenethyl) silyl groups.

As the polyether, polyethylene, polypropylene or the like may be used. These may be used each singly or in combination.

The glycidyl group-containing vinyl unit may include glycidyl methacrylate, glycidyl itaconate, diglycidyl itaconate, allyl glycidyl ether, styrene-4-glycidyl ether and 4-glycidyl styrene. These may be used each singly or in combination.

Commercially available products, which are preferably usable, include METABLEN S-2200 (trade name; available from Mitsubishi Rayon Co. Ltd.). The mass ratio of the epoxy-modified silicone-acrylic rubber (B1) is preferably from 2.5% by mass or more to 17.5% by mass or less, and more preferably from 2.5% by mass or more to 10% by mass or less, based on 100% by mass of the whole composition.

When the mass ratio is in the range of from 2.5% by mass or more to 17.5% by mass or less, good effects are exhibited on the Charpy impact value that is an index of impact resistance and on the load-deflection temperature that is an index of heat resistance.

In the methyl methacrylate-butadiene-styrene copolymer rubber (B2) used in the present invention, the core layer is formed of a butadiene-styrene polymer, and the shell layer is formed of a methyl methacrylate.

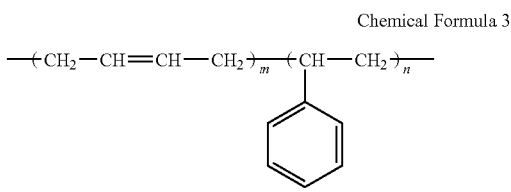

Chemical Formula 3

Chemical Formula 3 represents the unit structure of the butadiene-styrene polymer contained in the core layer, in which the left-hand moiety of Chemical Formula 3 is the butadiene unit and the right-hand moiety is the styrene unit.

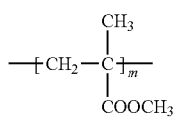

Chemical Formula 4

Chemical Formula 4 represents the unit structure of the methyl methacrylate polymer contained in the shell layer.

Commercially available products, which are preferably usable, includes METABLEN C-223A, METABLEN C-323A, METABLEN C-215A, METABLEN C-201A, METABLEN C-202, METABLEN C-102, METABLEN C-104A and METABLEN C-132 (trade names; available from Mitsubishi Rayon Co. Ltd.), and KANE ACE (trade name; available from Kaneka Corporation).

The mass ratio of the methyl methacrylate-butadiene-styrene copolymer rubber (B2) is preferably from 2.5% by mass or more to 17.5% by mass or less, and more preferably from 2.5% by mass or more to 10% by mass or less, based on 100% by mass of the whole composition. When the mass ratio is within the above range, good effects are exhibited on the Charpy impact value that is an index of impact resistance and on the load-deflection temperature that is an index of heat resistance.

The polylactic acid resin composition according to the present invention is characterized by including the polylactic acid (A), the epoxy-modified silicone-acrylic rubber (B1) and the methyl methacrylate-butadiene-styrene copolymer rubber (B2). In addition, these are preferably in such a mass ratio that the polylactic acid (A) is from 65% by mass or more to 95% by mass or less, the epoxy-modified silicone-acrylic rubber (B1) is from 2.5% by mass or more to 17.5% by mass or less and the methyl methacrylate-butadiene-styrene copolymer rubber (B2) is from 2.5% by mass or more to 17.5% by mass or less, based on 100% by mass of the whole composition. This composition is molded by injection molding or the like, and a molded product can be obtained which has a good impact resistance of 27 kJ/m$^2$ or more. Further, the molded product not only can be improved in impact resistance, but also can be controlled so that deterioration in heat resistance and bendability is minimal. The present invention is applicable not only to virgin materials, but also to recycled materials collected from market.

EXAMPLES

The present invention is described below in greater detail by giving Examples. It should be noted that the present invention is by no means limited by the following Examples, and can variously be modified unless exceeding its gist.

Evaluation was made on the following items.

(1) Evaluation of Impact Resistance:

Using strip specimens (80 mm×10 mm×4.0 mm) produced in the present Examples, the impact resistance of polylactic acid resin compositions of the present Examples was evaluated by the Charpy impact value. The evaluation was made according to ISO 179 (Type-A notches formed by using Notching Tool A-3 (trade name; manufactured by Toyo Seiki Seisakusho, Ltd.)), and the measurement was made by using a measuring instrument Digital Impact Tester DG-UB (trade name; manufactured by Toyo Seiki Seisakusho, Ltd.) on four specimens (number n=4) for each Example.

(2) Evaluation of Heat Resistance:

Using the strip specimens produced in the present Examples, the heat resistance of polylactic acid resin compositions of the present Examples was evaluated by the load-deflection temperature. The heat resistance was evaluated according to ISO 75 (flatwise, stress of 0.45 MPa, and heating rate of 2° C./min), and measured with a measuring instrument HDT/VSPT Tester TM-4126 (trade name; manufactured by Ueshima Seisakusho Co., Ltd.) on two specimens (number n=2) for each Example.

(3) Bendability:

Using the strip specimens produced in the present Examples, the flexural properties of polylactic acid resin compositions of the present Examples were evaluated by the three-point bending test (bending modulus, maximum bending strength). The evaluation was made according to ISO 178, and the measurement was made by using a measuring instrument, a precision universal tester AUTOGRAPH AG-IS (trade name; manufactured by Shimadzu Corporation) on four specimens (number n=4) for each Example.

Example 1

The following raw-materials were prepared as the component A (polylactic acid), the component B1 (epoxy-modified silicone-acrylic rubber) and the component B2 (methyl methacrylate-butadiene-styrene copolymer rubber).
Component A: Polylactic acid (trade name: LACEA H100, available from Mitsui Chemicals, Inc.).
Component B1: Epoxy-modified silicone-acrylic rubber (trade name: METABLEN S-2200, available from Mitsubishi Rayon Co. Ltd.).
Component B2: Methyl methacrylate-butadiene-styrene copolymer rubber (trade name: METABLEN C-223A, available from Mitsubishi Rayon Co. Ltd.).

95% by mass of the component A, 2.5% by mass of the component B1 and 2.5% by mass of the component B2 were melt-kneaded at 180° C. by means of LABO PRASTOMILL 4C-150 (trade name; manufactured by Toyo Seiki Seisakusho, Ltd.) to prepare a resin composition. Strip specimens (80 mm×10 mm×4.0 mm) were produced by using an injection molding machine SE18DU (trade name; manufactured by Sumitomo Heavy Industries, Ltd.). The mold temperature was set at 100° C. to 105° C., molding temperature was set at 190° C., and dwell pressure application was set at 70 MPa.

Example 2

The component A (polylactic acid), the component B1 (epoxy-modified silicone-acrylic rubber) and the component B2 (methyl methacrylate-butadiene-styrene copolymer rubber) were used in amounts of 93% by mass, 3.5% by mass and 3.5% by mass, respectively. Except for the above, the procedure of Example 1 was repeated to carry out melt-kneading by means of LABO PRASTOMILL, producing strip specimens by using the injection molding machine.

Example 3

The component A (polylactic acid), the component B1 (epoxy-modified silicone-acrylic rubber) and the component B2 (methyl methacrylate-butadiene-styrene copolymer rubber) were used in amounts of 90% by mass, 7.5% by mass and 2.5% by mass, respectively. Except for the above, the procedure of Example 1 was repeated to carry out melt-kneading by means of LABO PRASTOMILL, producing strip specimens by using the injection molding machine.

Example 4

The component A (polylactic acid), the component B1 (epoxy-modified silicone-acrylic rubber) and the component B2 (methyl methacrylate-butadiene-styrene copolymer rubber) were used in amounts of 90% by mass, 5% by mass and 5% by mass, respectively. Except for the above, the procedure of Example 1 was repeated to carry out melt-kneading by means of LABO PRASTOMILL, producing strip specimens by using the injection molding machine.

Example 5

The component A (polylactic acid), the component B1 (epoxy-modified silicone-acrylic rubber) and the component B2 (methyl methacrylate-butadiene-styrene copolymer rubber) were used in amounts of 90% by mass, 2.5% by mass and 7.5% by mass, respectively. Except for this, the procedure of Example 1 was repeated to carry out melt-kneading by means of LABO PRASTOMILL, producing strip specimens by using the injection molding machine.

Example 6

The component A (polylactic acid), the component B1 (epoxy-modified silicone-acrylic rubber) and the component B2 (methyl methacrylate-butadiene-styrene copolymer rubber) were used in amounts of 85% by mass, 7.5% by mass and 7.5% by mass, respectively. Except for the above, the procedure of Example 1 was repeated to carry out melt-kneading by means of LABO PRASTOMILL, producing strip specimens by using the injection molding machine.

Example 7

The component A (polylactic acid), the component B1 (epoxy-modified silicone-acrylic rubber) and the component B2 (methyl methacrylate-butadiene-styrene copolymer rubber) were used in amounts of 80% by mass, 10% by mass and 10% by mass, respectively. Except for this, the procedure of Example 1 was repeated to carry out melt-kneading by means of LABO PRASTOMILL and further produce oblong-card test pieces by using the injection molding machine.

Comparative Example 1

Except that the component B1 and the component B2 were not added, the procedure of Example 1 was repeated to carry out melt-kneading by means of LABO PRASTOMILL 4C-150, producing strip specimens by using the injection molding machine.

Comparative Example 2

The component A (polylactic acid) and the component B1 (epoxy-modified silicone-acrylic rubber) were used in amounts of 95% by mass and 5% by mass, respectively, and melt kneaded, and the component B2 (methyl methacrylate-butadiene-styrene copolymer rubber) was not added. Except for the above, the procedure of Example 1 was repeated to carry out melt-kneading by means of LABO PRASTOMILL, producing strip specimens by using the injection molding machine.

Comparative Example 3

The component A (polylactic acid) was used in an amount of 95% by mass, the component B1 (epoxy-modified silicone-acrylic rubber) was not added and the component B2 (methyl methacrylate-butadiene-styrene copolymer rubber) was added in an amount of 5% by mass. Except for the above, the procedure of Example 1 was repeated to carry out melt-kneading by means of LABO PRASTOMILL, producing strip specimens by using the injection molding machine.

Comparative Example 4

The component A (polylactic acid) and the component B1 (epoxy-modified silicone-acrylic rubber) were used in amounts of 90% by mass and 10% by mass, respectively, and melt kneaded, and the component B2 (methyl methacrylate-butadiene-styrene copolymer rubber) was not added. Except for the above, the procedure of Example 1 was repeated to carry out melt-kneading by means of LABO PRASTOMILL, producing strip specimens by using the injection molding machine.

Comparative Example 5

The component A (polylactic acid) was used in an amount of 90% by mass, the component B1 (epoxy-modified silicone-acrylic rubber) was not added and the component B2 (methyl methacrylate-butadiene-styrene copolymer rubber) was added in an amount of 10% by mass. Except for the above, the procedure of Example 1 was repeated to carry out melt-kneading by means of LABO PRASTOMILL, producing strip specimens by using the injection molding machine.

Comparative Example 6

The following raw-materials were prepared as the component A (polylactic acid), the component B2 (methyl methacrylate-butadiene-styrene copolymer rubber) and a component B3 (silicone-acrylic rubber).
Component A: Polylactic acid (trade name: LACEA H100, available from Mitsui Chemicals, Inc.).
Component B2: Methyl methacrylate-butadiene-styrene copolymer rubber (trade name: METABLEN C-223A, available from Mitsubishi Rayon Co. Ltd.).
Component B3: Silicone-acrylic rubber (trade name: METABLEN S-2001, available from Mitsubishi Rayon Co. Ltd.).
The component A (polylactic acid), the component B2 (methyl methacrylate-butadiene-styrene copolymer rubber) and the component B3 (silicone-acrylic rubber) were used in amounts of 90% by mass, 5% by mass and 5% by mass, respectively. Except for the above, the procedure of Example 1 was repeated to carry out melt-kneading by means of LABO PRASTOMILL, producing strip specimens by using the injection molding machine.

Comparative Example 7

The following raw-materials were prepared as the component A (polylactic acid), the component B2 (methyl methacrylate-butadiene-styrene copolymer rubber) and a component B4 (AS graft silicone-acrylic rubber).
Component A: Polylactic acid (trade name: LACEA H100, available from Mitsui Chemicals, Inc.).
Component B2: Methyl methacrylate-butadiene-styrene copolymer rubber (trade name: METABLEN C-223A, available from Mitsubishi Rayon Co. Ltd.).
Component B4: AS graft silicone-acrylic rubber (trade name: METABLEN SRK-200, available from Mitsubishi Rayon Co. Ltd.).
The component A (polylactic acid), the component B2 (methyl methacrylate-butadiene-styrene copolymer rubber) and the component B4 (AS graft silicone-acrylic rubber) were used in amounts of 90% by mass, 5% by mass and 5% by mass, respectively. Except for the above, the procedure of Example 1 was repeated to carry out melt-kneading by means of LABO PRASTOMILL, producing strip specimens by using the injection molding machine.

Comparative Example 8

The following raw-materials were readied as the component A (polylactic acid), the component B2 (methyl methacrylate-butadiene-styrene copolymer rubber) and a component B5 (acrylic composite rubber).
Component A: Polylactic acid (trade name: LACEA H100, available from Mitsui Chemicals, Inc.).
Component B2: Methyl methacrylate-butadiene-styrene copolymer rubber (trade name: METABLEN C-223A, available from Mitsubishi Rayon Co. Ltd.).
Component B5: Acrylic composite rubber (trade name: METABLEN W450A, available from Mitsubishi Rayon Co. Ltd.).
The component A (polylactic acid), the component B2 (methylmethacrylate-butadiene-styrene copolymer rubber) and the component B5 (acrylic composite rubber) were used in amounts of 90% by mass, 5% by mass and 5% by mass, respectively. Except for this, the procedure of Example 1 was repeated to carry out melt-kneading by means of LABO PRASTOMILL, producing strip specimens by using the injection molding machine.

Comparative Example 9

The following raw-materials were readied as the component A (polylactic acid), the component B1 (epoxy-modified silicone-acrylic rubber) and a component B5 (acrylic composite rubber).
Component A: Polylactic acid (trade name: LACEA H100, available from Mitsui Chemicals, Inc.).
Component B1: Epoxy-modified silicone-acrylic rubber (trade name: METABLEN S-2200, available from Mitsubishi Rayon Co. Ltd.).
Component B5: Acrylic composite rubber (trade name: METABLEN W450A, available from Mitsubishi Rayon Co. Ltd.).
The component A (polylactic acid), the component B1 (epoxy-modified silicone-acrylic rubber) and the component B5 (acrylic composite rubber) were used in amounts of 90% by mass, 5% by mass and 5% by mass, respectively. Except for the above, the procedure of Example 1 was repeated to carry out melt-kneading by means of LABO PRASTOMILL, producing strip specimens by using the injection molding machine.

The evaluation results of the above Examples are shown in Table 1. The evaluation results of the above Comparative Examples are shown in Table 2.

TABLE 1

|  | Units | Example 1 | Example 2 | Example 3 | Example 4 | Example 5 | Example 6 | Example 7 |
|---|---|---|---|---|---|---|---|---|
| Component A: PLA | mass % | 95 | 93 | 90 | 90 | 90 | 85 | 80 |
| Components B | | | | | | | | |
| B1: METABLEN S-2200 (epoxy-modified silicone-acrylic rubber) | mass % | 2.5 | 3.5 | 7.5 | 5 | 2.5 | 7.5 | 10 |
| B2: METABLEN C-223A (methyl methacrylate-butadiene-styrene copolymer rubber) | mass % | 2.5 | 3.5 | 2.5 | 5 | 7.5 | 7.5 | 10 |
| Total of Components B: | mass % | 5 | 7 | 10 | 10 | 10 | 15 | 20 |
| Charpy impact strength | $kJ/m^2$ | 27.1 | 41.7 | 49.6 | 79.7 | 66.6 | 99 | 103.4 |
| Load-deflection temperature (0.45 MPa) | °C. | 89 | 86 | 80 | 78 | 79 | 75 | 72 |
| Bendability | MPa | 88 | 83 | 83 | 77 | 77 | 70 | 67 |
| Bending modulus | MPa | 3,500 | 3,300 | 3,300 | 3,100 | 3,000 | 2,900 | 2,800 |

TABLE 2

|  | Units | Comparative Example 1 | 2 | 3 | 4 | 5 | 6 | 7 | 8 | 9 |
|---|---|---|---|---|---|---|---|---|---|---|
| Component A: PLA | mass % | 100 | 95 | 95 | 90 | 90 | 90 | 90 | 90 | 90 |
| Components B | | | | | | | | | | |
| B1: METABLEN S-2200 (epoxy-modified silicone-acrylic rubber) | mass % | — | 5 | — | 10 | — | — | — | — | 5 |
| B2: METABLEN C-223A (methyl methacrylate-butadiene-styrene copolymer rubber) | mass % | — | — | 5 | — | 10 | 5 | 5 | 5 | — |
| B3: METABLEN S-2001 | mass % | — | — | — | — | — | 5 | — | — | — |
| B4: METABLEN SRK-200 | mass % | — | — | — | — | — | — | 5 | — | — |
| B5: METABLEN W-450A | mass % | — | — | — | — | — | — | — | 5 | 5 |
| Components B, Total: | mass % | 0 | 5 | 5 | 10 | 10 | 10 | 10 | 10 | 10 |
| Charpy impact strength | $kJ/m^2$ | 3.6 | 16.1 | 13.8 | 27.9 | 25.1 | 21.4 | 14.2 | 21.6 | 35.7 |
| Load-deflection temperature (0.45 MPa) | °C. | 104 | 88 | 94 | 80 | 81 | 82 | 82 | 85 | 78 |
| Bendability | MPa | 95 | 90 | 88 | 90 | 83 | 77 | 73 | 79 | 79 |
| Bending modulus | MPa | 3,900 | 3,500 | 3,500 | 3,300 | 3,200 | 3,100 | 3,000 | 3,000 | 3,100 |

Figure 2:
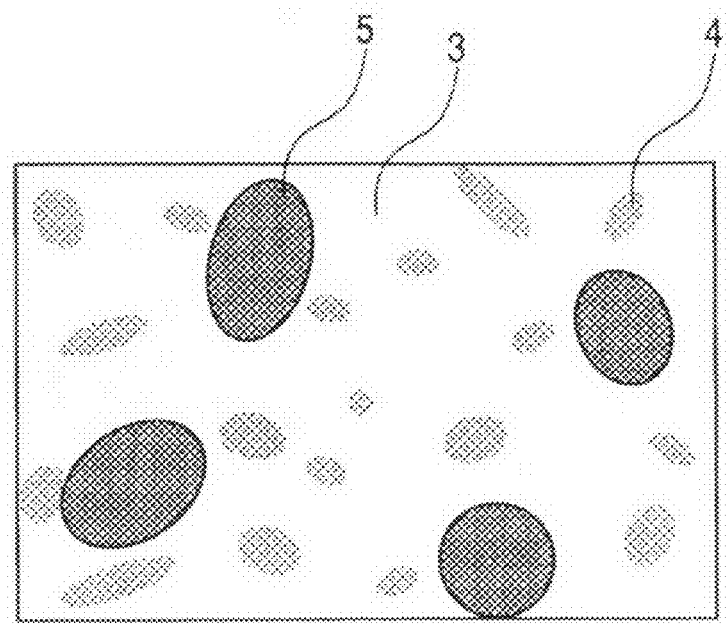
FIG. 2 is a schematic view showing an island-in-sea structure in the present invention.

As shown in Tables 1 and 2, it is seen that, compared with Comparative Examples 2 and 3, the polylactic acid resin composition of Example 1 is greatly improved in the Charpy impact value even though the rubber components are added in the same total mass (5% by mass). This is considered to be due to well-balanced formation of such a clear island-in-sea structure as shown in FIG. 2, having, in a sea 3 of the polylactic acid, distribution of islands 4 of about 100 nm in size which come from the epoxy-modified silicone-acrylic rubber and islands 5 of about 300 nm in size which come from the methyl methacrylate-butadiene-styrene copolymer rubber; the structure being formed when the epoxy-modified silicone-acrylic rubber and the methyl methacrylate-butadiene-styrene copolymer rubber become dispersed in the polylactic acid.

It is also seen that, compared with Comparative Examples 4 and 5, the polylactic acid resin compositions of Examples 3 to 5 are greatly improved in the Charpy impact value even though the rubber components are added in the same total mass (10% by mass).

It is commonly known that the load-deflection temperature (0.45 MPa) for evaluating the heat resistance of thermoplastic resin compositions becomes lower in proportion to the amount of a rubber component(s) added. More specifically, the load-deflection temperature becomes lower as the rubber component is added in a larger quantity in order to improve impact resistance. However, in the present invention, the epoxy-modified silicone-acrylic rubber and methyl methacrylate-butadiene-styrene copolymer rubber are added to minimize the amount of a rubber component(s) to be added for that purpose. As a result, the molded product can be controlled so that a decrease in the load-deflection temperature is minimized. It is also seen that deterioration in the bending modulus and bending strength as well can be minimized by minimizing the amount of rubber component(s) to be added.

Further, making a comparison between Example 4 and Comparative Examples 6 to 9, it is seen that even when the rubber components are added in the same total mass (10% by mass), the combination of the epoxy-modified silicone-acrylic rubber with the methyl methacrylate-butadiene-styrene copolymer rubber as in the present invention is most superior. This is considered to be due to the fact that the epoxy-modified silicone-acrylic rubber is improved in compatibility with the resin in virtue of the epoxy group in some cases and that the islands of about 100 nm in size which come from the epoxy-modified silicone-acrylic rubber and the islands of about 300 nm in size which come from the methyl methacrylate-butadiene-styrene copolymer rubber is dispersed in well-balanced distribution.

As stated above, according to the present invention, the polylactic acid resin composition superior impact resistance can be easily produced.

POSSIBILITY OF INDUSTRIAL APPLICATION

The present invention is applicable to polylactic acid resin compositions whose impact resistance is intended to be improved. It is also applicable not only to virgin materials, but also to recycled materials collected from the market, and is usable for recovering the physical properties.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-115735, filed Apr. 25, 2008, which is hereby incorporated by reference herein in its entirety.

The invention claimed is:

1. A polylactic acid resin composition which comprises a polylactic acid (A), an epoxy-modified silicone-acrylic rubber (B1) and a methyl methacrylate-butadiene-styrene copolymer rubber (B2).

2. A polylactic acid resin composition which comprises a polylactic acid (A), an epoxy-modified silicone-acrylic rubber (B1) and a methyl methacrylate-butadiene-styrene copolymer rubber (B2), wherein the polylactic acid (A) is in a content of from 65% by mass or more to 95% by mass or less, the epoxy-modified silicone-acrylic rubber (B1) is in a content of from 2.5% by mass or more to 17.5% by mass or less, and the methyl methacrylate-butadiene-styrene copolymer rubber (B2) is in a content of from 2.5% by mass or more to 17.5% by mass or less, based on 100% by mass of the whole composition.

3. A molded product which is formed from the polylactic acid resin composition according to claim 1.

* * * * *